Oct. 7, 1930.   C. MIEDBRODT   1,777,444
HYDROGEN GENERATOR
Filed Feb. 27, 1929
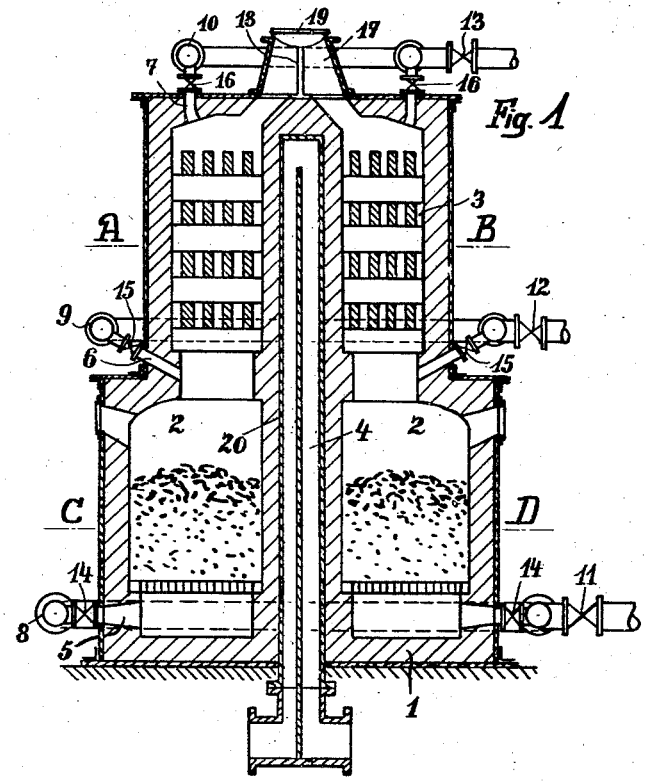
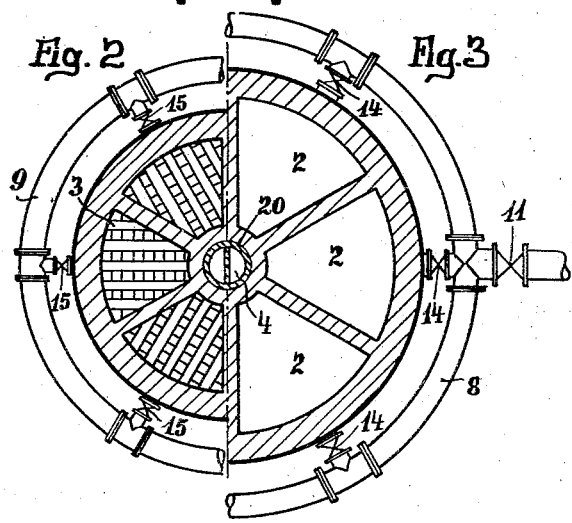
Inventor:
Carl Miedbrodt
By John B. Brady
Attorney Patented Oct. 7, 1930

1,777,444

UNITED STATES PATENT OFFICE

CARL MIEDBRODT, OF BERLIN-ROSENTHAL, GERMANY

HYDROGEN GENERATOR

Application filed February 27, 1929, Serial No. 342,981, and in Germany February 22, 1928.

In known hydrogen generators which operate on the steam-iron system and which are provided with a superimposed heating chamber for intermittent working, there militates against any appreciable increase in their output the fact that a column of ore which a multiple of the cross-sectional area, hitherto giving the best yield, would present, is unequally affected by the reduction gases and vapours passing through. In using such large cross-sectional areas the output would be relatively smaller on account of the varying resistance of the charge owing to the different sizes of grain and the premature exhaustion resulting from the overcharging of certain portions.

According to the present invention a hydrogen generator is provided whose output corresponds to the specific yields obtainable from separate sets of apparatus, by increasing the cross section of the column of ore, in that a plurality of units are disposed, preferably in a radial manner, on a common base, whilst their intakes and outlets for gas, air and steam which are connected in parallel are actuated by a common means of control. This novel, cellular disposition of the units affords the advantages that the space required for the accommodation of such a large aggregation is far smaller than that needed for the former arrangement of separate units, that the specific yield is the same as in the case of a plurality of apparatus with shafts of small cross section, and that the attention to and control of the units from a central position, in the case of the present embodiment, are considerably simplified.

Another result is that the circular arrangement of the casing enclosing the several cells, like the independent apparatus of circular cross section, presents the maximum of resistance to internal positive pressure.

Moreover, the novel, cellular disposition of the units results in an important reduction in the detrimental radiation of heat; a point of special importance when, as is usual nowadays, it is desired to recover the largest possible quantity of combustible reduction gas, since the smaller the radiation of heat from the hydrogen generator, the smaller the proportion of the residual reduction gas needed for heating up the heating chamber and the column of ore every time.

A typical embodiment of the subject of the invention is illustrated in the drawing, in which, Fig. 1 represents a vertical section through the hydrogen generator, Fig. 2 a cross section along the line A—B of Fig. 1, and Fig. 3 a cross section along the line C—D of Fig. 1.

The common base 1 carries the units of the hydrogen generator, consisting of the ore chamber 2 and the superimposed heating chamber 3, arranged in the form of cells radially around the tubular shaft 4 for preheating the reduction gas. The base area of the unit is so calculated that the cross section of the individual columns of ore ensures the maximum yield. Each unit is provided with the requisite connections 5 for gas, 6 for air and 7 for air and steam, each set of connections of the same kind opening into the corresponding annular mains 8, 9 and 10 respectively. These mains are provided with the closing members 11, 12 and 13, which are controlled from one position.

In order to enable irregularities in the working of the units under joint control to be compensated for adjustable throttles 14, 15 and 16 are provided on the intake and outlet connections between the units and the annular mains. A common outlet branch 17 for all the units is provided for the gases of combustion, its interior space being divided, by partitions 18, into as many separate outlet passages as there are units. The partitions 17 of said outlet branch 18 are arranged in such a way that closing the shut-off valve 19 not only closes the total aperture in relation to the outside, but also shuts off the passages formed by the partitions 18 from one another.

The tubular shaft 4 provided for preheating the reduction gas is lined with a tube 20, of metal or other suitable material, which at the same time serves to seal this hollow space in relation to the ore chambers 2 and heating chambers 3. The tube 20 may also be replaced by any other suitable preheater, or, by employing suitable material, the shaft 4 may be used as a preheater without any further lining.

I claim:

1. A hydrogen generator for the steam-iron process comprising, in combination, a common base, a plurality of cells thereon for holding the ore, a plurality of heating cells superimposed upon, and in communication with the ore-holding cells, and a plurality of gas inlets and outlets for the several cells which are thereby connected up in parallel.

2. A hydrogen generator for the steam-iron process comprising, in combination, a casing, a central tubular preheating shaft therein, a plurality of partitions extending radially from said shaft and dividing the lower part of the casing into a plurality of ore-holding cells, a plurality of similarly arranged partitions dividing the upper part of the casing into a plurality of heating cells in communication with the ore-holding cells, and a plurality of gas inlets and outlets for the several cells which are thereby connected up in parallel.

3. A hydrogen generator for the steam-iron process comprising, in combination, a common base, a plurality of cells thereon for holding ore, a plurality of heating cells superimposed upon, and in communication with the ore-holding cells, a plurality of gas inlets for the several cells, and a common closable outlet, divided up to its mouth by partitions in accordance with the number of heating cells, so that the several units, each made up of an ore-holding cell and a heating cell are connected up in parallel.

4. A hydrogen generator for the steam-iron process comprising, in combination, a casing, a central tubular preheating shaft therein, a plurality of partitions extending radially from said shaft dividing the casing into a plurality of ore-holding cells in its lower part and into a similar number of heating cells in its upper part in communication with the iron-holding cells, a plurality of gas inlets for the several cells, and a common closable outlet, divided up to its mouth by partitions in accordance with the number of heating cells, so that the several units, each made up of an iron-holding cell and a heating cell are connected up in parallel.

5. A hydrogen generator for the steam-iron process comprising, in combination, a common base, a plurality of cells thereon for holding ore, a plurality of heating cells superimposed upon, and in communication with the ore-holding cells, members in each heating cell forming a honeycomb arrangement therein, and a plurality of gas inlets and outlets for the several cells which are thereby connected up in parallel.

6. A hydrogen generator for the steam-iron process comprising, in combination, a casing, a central tubular preheating shaft therein, a plurality of partitions extending radially from said shaft and dividing the lower part of the casing into a plurality of ore-holding cells, a plurality of similarly arranged partitions dividing the upper part of the casing into a plurality of heating cells in communication with the ore-holding cells, members in each heating cell forming a honeycomb arrangement therein, and a plurality of gas inlets and outlets for the several cells which are thereby connected up in parallel.

7. A hydrogen generator for the steam-iron process comprising, in combination, a common base, a plurality of cells thereon for holding ore, a plurality of heating cells superimposed upon, and in communication with the iron-holding cells, members in each heating cell forming a honeycomb arrangement therein, a plurality of gas inlets for the several cells, and a common closable outlet, divided up to its mouth by partitions in accordance with the number of heating cells, so that the several units, each made up of an ore-holding cell and a heating cell are connected up in parallel.

8. A hydrogen generator for the steam-iron process comprising, in combination, a casing, a central tubular preheating shaft therein, a plurality of partitions extending radially from said shaft dividing the casing into a plurality of ore-holding cells in its lower part and into a similar number of heating cells in its upper part in communication with the ore-holding cells, members in each heating cell forming a honeycomb arrangement therein, a plurality of gas inlets for the several cells, and a common closable outlet, divided up to its mouth by partitions in accordance with the number of heating cells, so that the several units, each made up of an ore-holding cell and a heating cell are connected up in parallel.

9. A hydrogen generator for the steam-iron process comprising, in combination, a common base, a plurality of cells thereon for holding ore, a plurality of heating cells superimposed upon, and in communication with the ore-holding cells, a plurality of gas inlets and outlets for the several cells which are thereby connected up in parallel, and a valve device in, and controlling, each gas inlet and outlet.

10. A hydrogen generator for the steam-iron process comprising, in combination, a casing, a central tubular preheating shaft therein, a plurality of partitions extending radially from said shaft and dividing the lower part of the casing into a plurality of ore-holding cells, a plurality of similarly arranged partitions dividing the upper part of the casing into a plurality of heating cells in communication with the ore-holding cells, a plurality of gas inlets and outlets for the several cells which are thereby connected up in parallel, and a valve device in, and controlling, each gas inlet and outlet.

11. A hydrogen generator for the steam-iron process comprising, in combination, a casing, a central tubular preheating shaft therein, a plurality of partitions extending radially from said shaft dividing the casing into a plurality of ore-holding cells in its lower part and into a similar number of heating cells in its upper part in communication with the ore-holding cells, members in each heating cell forming a honeycomb arrangement therein, a plurality of gas inlets for the several cells, a valve device in each such inlet, and a common closable outlet, divided up to its mouth by partitions in accordance with the number of heating cells, so that the several units, each made up of an ore-holding cell and a heating cell are connected up in parallel.

12. A hydrogen generator for the steam-iron process comprising, in combination, a casing, a central tubular preheating shaft therein, a plurality of partitions extending radially from said shaft dividing the casing into a plurality of ore-holding cells in its lower part and into a similar number of heating cells in its upper part in communication with the ore-holding cells, members in each heating cell forming a honeycomb arrangement therein, a plurality of gas inlets for the several cells, a valve device in each such inlet, a common closable outlet, divided up to its mouth by partitions in accordance with the number of heating cells, so that the several units, each made up of an ore-holding cell and a heating cell are connected up in parallel, and a main valve device controlling each set of gas inlets or outlets.

In testimony whereof I affix my signature.

CARL MIEDBRODT.